(12) United States Patent
Bindler

(10) Patent No.: US 6,220,151 B1
(45) Date of Patent: Apr. 24, 2001

(54) PLANT FOR PRODUCING ARTICLES, COMPRISING AT LEAST ONE REFRIGERATION SECTION

(75) Inventor: Uwe Bindler, Bergneustadt (DE)

(73) Assignee: Gebr. Bindler Maschinenfabrik GmbH & Co. KG, Bergneustadt (DE)

( * ) Notice: Subject to any disclaimer, the term of this patent is extended or adjusted under 35 U.S.C. 154(b) by 0 days.

(21) Appl. No.: 09/259,499

(22) Filed: Feb. 26, 1999

(30) Foreign Application Priority Data

Mar. 6, 1998 (DE) .............................. 198 09 652

(51) Int. Cl.[7] .................. A23G 1/00; A23G 7/00
(52) U.S. Cl. .................. 99/353; 99/355; 99/452; 99/455; 99/483; 99/517
(58) Field of Search .............. 62/407, 354; 236/49, 236/3; 454/233, 236; 99/353–355, 452–456, 467–473, 477, 483, 485, 486, 487, 348, 516, 517; 426/262, 454, 459, 464, 465, 373, 515, 516, 660, 331

(56) References Cited

U.S. PATENT DOCUMENTS

| 3,663,231 | * | 5/1972 | Tourell | 99/485 |
|---|---|---|---|---|
| 3,682,086 | * | 8/1972 | Ocker | 99/485 |
| 3,777,807 | | 12/1973 | Carroll | 165/64 |
| 3,955,489 | * | 5/1976 | Goerling et al. | 426/631 X |
| 4,272,966 | * | 6/1981 | Niemann et al. | 236/49.3 |
| 4,437,608 | * | 3/1984 | Smith | 236/49.3 |
| 4,620,477 | * | 11/1986 | Ripani et al. | 99/486 |
| 4,679,498 | * | 7/1987 | Chaveron et al. | 99/483 |
| 4,836,483 | * | 6/1989 | Nurczyk et al. | 236/49.3 |
| 5,025,638 | * | 6/1991 | Yamagishi et al. | 236/49.3 |
| 5,079,022 | * | 1/1992 | Jeanneret | 426/660 X |
| 5,657,687 | * | 8/1997 | Callebaut et al. | 99/472 X |
| 5,814,362 | * | 9/1998 | Muntener | 426/231 |
| 6,135,016 | * | 10/2000 | Bindler | 99/486 |

FOREIGN PATENT DOCUMENTS

| 3444060 A1 | 7/1986 | (DE) . |
|---|---|---|
| 4035392 A1 | 5/1992 | (DE) . |

* cited by examiner

Primary Examiner—Timothy F. Simone
(74) Attorney, Agent, or Firm—Proskauer Rose LLP

(57) ABSTRACT

The invention relates to a plant for producing chocolate articles, comprising at least one refrigeration section 5, 8, 12. Cold air supply to a chocolate plant is improved in that the cold air inlet 16, 17, 18 of the refrigeration section 5, 8, 12 is connected to a cold air duct of a central refrigeration system 14.

7 Claims, 2 Drawing Sheets

PLANT FOR PRODUCING ARTICLES, COMPRISING AT LEAST ONE REFRIGERATION SECTION

BACKGROUND OF THE INVENTION

The invention relates to a plant for producing chocolate articles, comprising at least one refrigeration section.

Apart from numerous other sections, conventional plants inter alia always also comprise one or several refrigeration sections. These refrigeration sections serve the purpose of cooling the chocolate or the chocolate filling. In the case of plants for producing chocolate, known from the state of the art, each refrigeration section has a refrigeration unit, comprising a refrigeration element, a fan and optionally a respective refrigerant processing plant. This traditional allocation of a refrigeration unit to a refrigeration section is problematic from various aspects. For example, the individual refrigeration units can often not ensure adequate dryness and coldness of the refrigerated air, because if they did the expenditure in relation to the refrigeration unit would be excessive. Cooling air containing too much moisture results in components within the cooling section corroding more quickly or results in unintended build-up of micro-organisms. A further problem in the case of the known refrigeration units, each with one refrigeration unit allocated, is that they necessitate expensive cold-air temperature control. As a rule, in the case of known refrigeration units, temperature control is by way of air temperature reading prior to air entering the heat exchanger. Such a temperature control provides only for average temperature setting accuracy. The known refrigeration units have a further problem in that the pressure differential generated in the cooling section, assisted by said refrigeration units, causes an influx of non-refrigerated secondary air through leakages in the refrigeration section. This too reduces the effectiveness of the refrigeration units.

Based on the problems outlined above, it is the object of the present invention to provide a plant for producing chocolate articles which ensures significantly improved cooling of the refrigeration section.

SUMMARY OF THE INVENTION

According to the invention the above-mentioned object is met in that the cold air inlet of a refrigeration section is connected to a cold air duct of a central refrigeration system. By providing a central refrigeration system instead of decentralized refrigeration units, it is possible to provide a central refrigeration system which is optimal from a production point of view and which overall does not entail any cost increase.

If the cold air duct of the central refrigeration system is connected in parallel to a multiple number of cooling sections, then it is thus ensured that each refrigeration section has an optimal supply of cold air.

In the hitherto known conventional plants for producing chocolate articles, there is no closed loop for the cooling air. According to a further embodiment of the invention, advantageous recycling of the outgoing air is achieved in that the outgoing air outlet of a refrigeration section is connected to the incoming air duct of the central refrigeration system. This results in a closed loop for the air used for cooling.

To ensure that for the production of chocolate articles the refrigeration sections of a plant configured according to the invention are always supplied with cold air of constant quality, it is advantageous if the central refrigeration system comprises an incoming-air conditioning unit.

In this, an air dehumidifier forming part of the central refrigeration system should be an essential part of such an incoming-air conditioning unit just described. With such an air dehumidifier, the moisture of the air can be significantly reduced, leading to improved cooling results, reduced transport losses when transporting cold air, and a reduction in the corrosion as well as in the hygiene problems within the refrigeration sections.

A further improvement of the cooling results can be achieved in that the central refrigeration system comprises a cold-air temperature regulator. Such a cold-air temperature regulator ensures that the cold air fed to the refrigeration sections is always of the desired temperature; as a rule an even temperature.

Increased pressure in the cold air system ensures a reduction of the influx of secondary air from the refrigeration sections. For this purpose the central refrigeration system comprises a condenser which increases the air pressure in the cold air duct. Slight overpressure is sufficient to reduce the influx of secondary air by way of leakages to such an extent that its effect is negligible.

Furthermore, the cooling requirements of the individual refrigeration sections can be individually adjusted in that the cold air inlet of a refrigeration section is connected to the cold air duct by way of an adjustable restrictor, with each restrictor being able to be adjusted in such a way that a desired quantity of cold air enters the respective refrigeration section.

There are a host of possibilities for configuring and improving the plant for producing chocolate articles, according to the invention. Such embodiments are explained both in the subordinate claims following claim 1 and in the description of an exemplary embodiment in conjunction with the drawings.

DETAILED DESCRIPTION OF THE INVENTION

Figure 1:
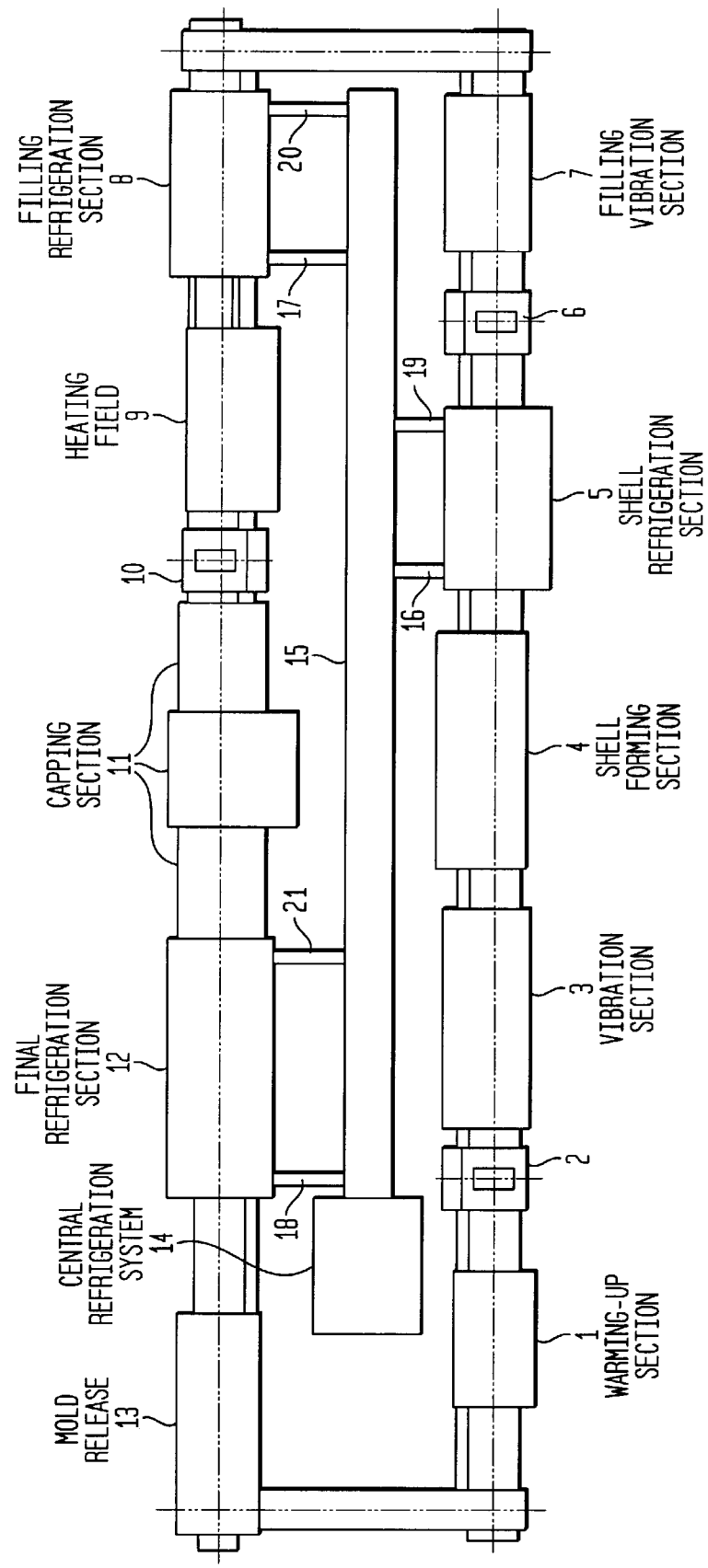
FIG. 1 is a diagram of a plant for producing chocolate articles in accordance with the present invention.

FIG. 1 shows an embodiment of a plant for producing chocolate articles, comprising a warming-up section 1 for warming up the empty molds for the chocolate articles; an apportioning section 2 for apportioning the chocolate mass into the molds; a vibration section 3 for homogenizing the chocolate mass; a shell-forming section 4 for forming shells within the chocolate mass; a shell refrigeration section 5 for intermediate cooling of the pre-formed shells; a filling apportioning section 6 for apportioning the fillings into the shells of the chocolate articles; and a filling vibration section 7 for homogenizing the fillings. In the embodiment shown in FIG. 1, the described sections are arranged along a first line segment. There is a second line segment, arranged parallel to this first line segment and in opposite direction; said second line segment comprising a filling refrigeration section 8 for intermediate cooling of the fillings of the chocolate articles, a heating field 9, a cap apportioning section 10 and an adjacent capping section 11 for producing a cap above the fillings placed into the shells of the chocolate articles. At the end of the second line segment there is a final refrigeration section 12 for final cooling of the chocolate articles, as well as a mold release section 13 for removing the chocolate articles from the moulds. From the mold release section 13 the empty molds are returned to the warming-up section 1. This closes the cycle of the production process.

Figure 2:
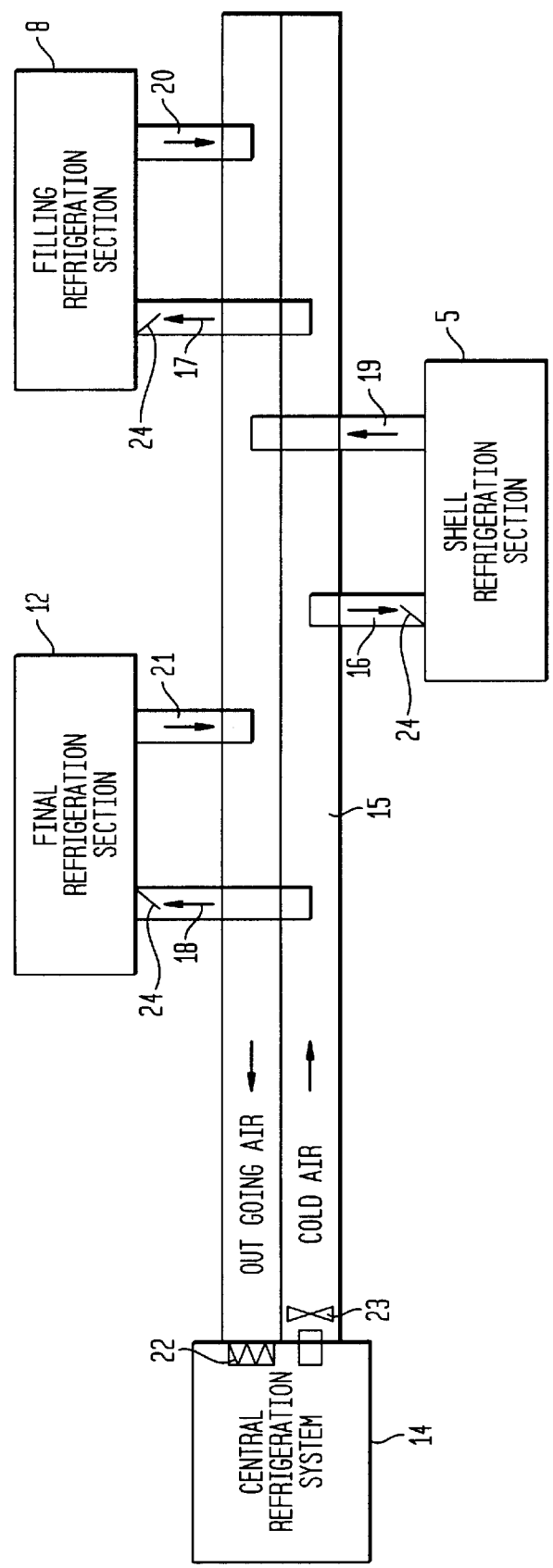
FIG. 2 is a diagram of the central refrigeration system in accordance with the present invention.

According to the invention, the refrigeration sections of the depicted plant for producing chocolate articles, namely the shell refrigeration section 5, the filling refrigeration section 8 and the final refrigeration section 12, are supplied with cold air by a centrally arranged refrigeration system 14, as shown in FIG. 2. The central refrigeration system 14 is connected to the individual refrigeration sections 5, 8, 12 by way of a central cold-air and incoming air duct 15. As shown in FIG. 2, the cold-air and incoming air duct 15 is provided with a condenser 23 which increases the air pressure in the cold-air duct. This cold-air and incoming air duct 15 is of course divided into a separate cold air duct and a separate incoming air duct. In FIG. 2 it is expressly shown that the cold air inlet 16 of the shell refrigeration section 5, the cold air inlet 17 of the filling refrigeration section 8 and the cold air inlet 18 of the final refrigeration section 12 are connected to the cold air duct of the cold-air and incoming air duct 15 of the central refrigeration section 14. Similarly, the outgoing air outlet 19 of the shell refrigeration section 5, the outgoing air outlet 20 of the filling refrigeration section 8 and the outgoing air outlet 21 of the final refrigeration section 12 are connected to the incoming air duct of the cold-air and incoming air duct 15 of the central refrigeration system 14.

The central refrigeration system 14 provided according to the invention comprises an outgoing-air conditioner with an air dehumidifier 22, a cold-air temperature regulator and a condenser 23, as shown in FIG. 2. Also shown in FIG. 2, in each of the cold air inlets 16, 17, 18, a restrictor 24 is arranged for apportioning the cold air supplied to the individual refrigeration sections 5, 8, 12.

What is claimed is:

1. A plant for producing chocolate articles comprising:
   a chocolate processing line including a warming-up section for warming empty chocolate molds, a chocolate apportioning section for apportioning a chocolate mass into the molds, a chocolate vibration section for homogenizing the chocolate mass, a shell-forming section for forming shells within the chocolate mass, a shell refrigeration section for cooling of the shells, a filling apportioning section for apportioning a filling into the shells, a filling vibration section for homogenizing the filling, a filling refrigeration section for cooling of the filling, a heating field, a cap apportioning section adjacent to a capping section for producing a cap above the filling placed into the shells of the chocolate articles, a final refrigeration section for final cooling of the chocolate articles, and a mold release section for removing the chocolate articles from the molds, and
   a central refrigeration system which includes a cold air duct and cold air inlets connecting the cold air duct to each of the shell refrigeration section, the filling refrigeration section, and the final refrigeration section.

2. A plant according to claim 1, wherein an outgoing air outlet of the shell refrigeration section, filling refrigeration section, and final refrigeration section is connected to the cold air duct of the central refrigeration system.

3. A plant according to claim 1 wherein said central refrigeration system includes an incoming air conditioning unit.

4. A plant according to claim 1 wherein said central refrigeration system includes an air dehumidifier.

5. A plant according to claim 1 wherein said central refrigeration system includes a cold air temperature regulator.

6. A plant according to claim 1 wherein said central refrigeration system includes a condenser which increases air pressure in the cold air duct.

7. A plant according to claim 1 wherein the cold air inlets of the shell refrigeration section, the filling refrigeration section, and the final refrigeration section are connected to the cold air duct by adjustable restrictors.

* * * * *